United States Patent [19]

Kawai et al.

[11] Patent Number: 4,953,649

[45] Date of Patent: Sep. 4, 1990

[54] FOUR-WHEEL STEERING DEVICE FOR AN AUTOMOBILE

[75] Inventors: Yoshikazu Kawai; Chosuke Sato; Masaru Kato, all of Shizuoka, Japan

[73] Assignee: Suzuki Jidosha Kogyo Kabushiki Kaisha, Shizuoka, Japan

[21] Appl. No.: 279,557

[22] Filed: Dec. 2, 1988

[30] Foreign Application Priority Data

Dec. 10, 1987 [JP] Japan ................................ 62-310946

[51] Int. Cl.$^5$ ............................................ B62D 5/06
[52] U.S. Cl. .................................. 180/79.1; 180/140; 180/142
[58] Field of Search ............... 180/140, 141, 142, 143, 180/79.1; 280/91; 318/378, 379, 380

[56] References Cited

FOREIGN PATENT DOCUMENTS

| 0243180 | 10/1987 | European Pat. Off. ............ 180/142 |
| 61-18569 | 1/1986 | Japan . |
| 61-202977 | 9/1986 | Japan . |
| 0080172 | 4/1987 | Japan .................... 180/140 |
| 0131875 | 6/1987 | Japan .................... 180/142 |
| 0221967 | 9/1987 | Japan .................... 180/79.1 |

Primary Examiner—Charles A. Marmor
Assistant Examiner—Wook Yoon
Attorney, Agent, or Firm—Flynn, Thiel, Boutell & Tanis

[57] ABSTRACT

A four-wheel steering device for an automobile includes a main turning arrangement for steering main wheels, a subsidiary turning arrangement for sterring subsidiary wheels, and a control system including a motor having terminals thereon, first and second steering angle sensor arrangements for detecting first and second steering angles of the main the subsidiary wheels, respectively, and a control arrangement. The control arrangement is responsive to a state change of the first and second detected steering angles for determining the operating state of the control system. The control arrangement is operable when the control system operates normally to drive and control the motor and thereby the subsidiary turning means so as to steer the subsidiary wheels depending on the steering angle of the main wheels. The control arrangement is further operable when the control system operates abnormally to cut off the power source to the motor in order to converge the steering angle of the subsidiary wheels gradually to zero and also to short-circuit the terminals of the motor.

3 Claims, 2 Drawing Sheets

FOUR-WHEEL STEERING DEVICE FOR AN AUTOMOBILE

FIELD OF THE INVENTION

This invention relates to a four-wheel steering device for an automobile, and more particularly to a four-wheel steering device which converges the steering angle of the subsidiary steered wheels gradually to zero in the event of abnormality of the motor control system to return the subsidiary steered wheels to the neutral position without causing sudden behavior changes of the vehicle, while steering the vehicle by only the two main steered wheels, thereby preventing abnormal control of the subsidiary steered wheels due to trouble in the control system by smoothly transferring from four-wheel steering to two-wheel steering.

BACKGROUND OF THE INVENTION

In a vehicle, the front wheels which are usually main steered wheels are disposed steerably in a desired running direction of the vehicle, while the rear wheels which are subsidiary steered wheels are disposed parallel to the longitudinal direction of the vehicle. When the front wheels of such vehicle are steered and turned, the front wheels and rear wheels do not match in the turning circle, and the rear wheels get inside of the turning circle due to inner wheel difference when the vehicle turns at low speed, while the front wheels get inside of the turning circle due to centrifugal force when the vehicle turns at high speed. Accordingly, when the front wheels are steered in the steering direction which is the running direction of the vehicle, the position of the vehicle cannot be matched with the turning direction.

A vehicle was hence proposed to have a four-wheel steering device for enhancing the traveling performance by steering not only the front wheels but also the rear wheels. That is, in this four-wheel steering device, a main turning means for steering front wheels and a subsidiary turning means for steering the rear wheels are provided in order to improve the recovery of the vehicle when parking in a garage or turning a narrow road at low speed, and enhance the steering stability when changing lanes at medium or high speed.

Such four-wheel steering device is disclosed, for example, in Japanese Laid-Open Patent Sho. 61-18569. What is disclosed in this publication is intended to prevent the steering angle of the rear wheels from being changed due to external force when the rear wheels are positioned near the neutral position, by suppressing the movement of the steering rod for the rear wheels by a friction mechanism when the rear wheels are positioned near the neutral position.

Various four-wheel steering devices have been devised which, for example, increase the degree of freedom for mounting by downsizing the subsidiary turning means for steering the rear wheels, or turn the rear wheels by using a motor as the driving source to realize an oil-free operation.

A four-wheel steering device using a motor is disclosed, for example, in Japanese Laid-Open Patent Sho. 61-202977 (and corresponding U.S. Pat. No. 4,645,025). What is disclosed in this publication is to define the shift of the steering rod for the rear wheels by a stopper mechanism or the like, while holding the rear wheels in the neutral position by a neutral position holding mechanism composed of a preset spring and others when external force is not applied on the rear wheels.

In the conventional four-wheel steering devices, however, when the vehicle is traveling at high speed and the rear wheels are rolling, if the power source to the motor is shut off due to trouble in the motor control system or the like, the rear wheels are suddenly returned to the vicinity of the neutral position by the external force and the action of a return spring, and there suddenly occurs a vehicle behavior change that the driver cannot cope with and which is very dangerous. In particular, while the rear wheels are steered in the same direction as the front wheels, and if the rear wheels are suddenly returned to the neutral position, the vehicle is suddenly oversteered, and a so-called tuck-in phenomenon occurs which can lead to spinning in a worst case.

It is hence a primary object of this invention to provide a four-wheel steering device for an automobile which results in enhanced safety by improving upon the above-discussed problems.

It is a further object of the invention to provide a four-wheel steering device which converges the steering angle of the subsidiary steered wheels gradually to zero in the event of abnormality of the motor control system to return the subsidiary steered wheels to the neutral position without causing sudden behavior change of the vehicle, while preventing abnormal control of the subsidiary steered wheels due to trouble in the control system by steering the vehicle only by the two main steered wheels, and which transfers smoothly from four-wheel steering to two-wheel steering.

SUMMARY OF THE INVENTION

To achieve the above object, this invention relates to a four-wheel steering device comprising main turning means for steering the main steered wheels, subsidiary turning means for steering the subsidiary steered wheels, a motor for driving and controlling this subsidiary turning means, a steering angle sensor for detecting the steering angle of the main steered wheels, and a steering angle sensor for detecting the steering angle of the subsidiary steered wheels. The operating state of a control system is judged by changes of the detection signals from the steering angle sensors for the main and subsidiary steered wheels. When this control system operates normally, the motor is driven and controlled so as to steer the subsidiary steered wheels depending on the steering angle of the main steered wheels. When this control system operates abnormally, the power source to the motor is cut off in order to converge the steering angle of the subsidiary steered wheels gradually to zero and to short-circuit the terminals of the motor.

According to a configuration of this invention, when the subsidiary steered wheels are steered by the motor, if an abnormality should occur in the control system of the motor, the power source to the motor is shut off by the control means, and the terminals of the motor are short circuited so that the motor is operated like a generator to converge the steering angle of the rear steered wheels gradually to zero so that the subsidiary steered wheels may return to the neutral position without causing a sudden behavior change of the vehicle, thus transferring to two-wheel steering to cause steering of the vehicle only by the main steered wheels. Hence, abnormal control of the subsidiary steered wheels due to trouble in the control system may be prevented, and four-wheel steering can be smoothly transferred to two-wheel steering, whereby safety is enhanced.

BRIEF DESCRIPTION OF THE DRAWINGS

FIGS. 1 to 3 refer to an embodiment of this invention wherein:

FIG. 1 is an outline drawing of a vehicle;

FIG. 2 is a circuit diagram of a control system; and

FIG. 3 is a characteristic diagram of steering angle versus time when the steering angle of the rear wheels returns to zero.

DETAILED DESCRIPTION

Figure 1:
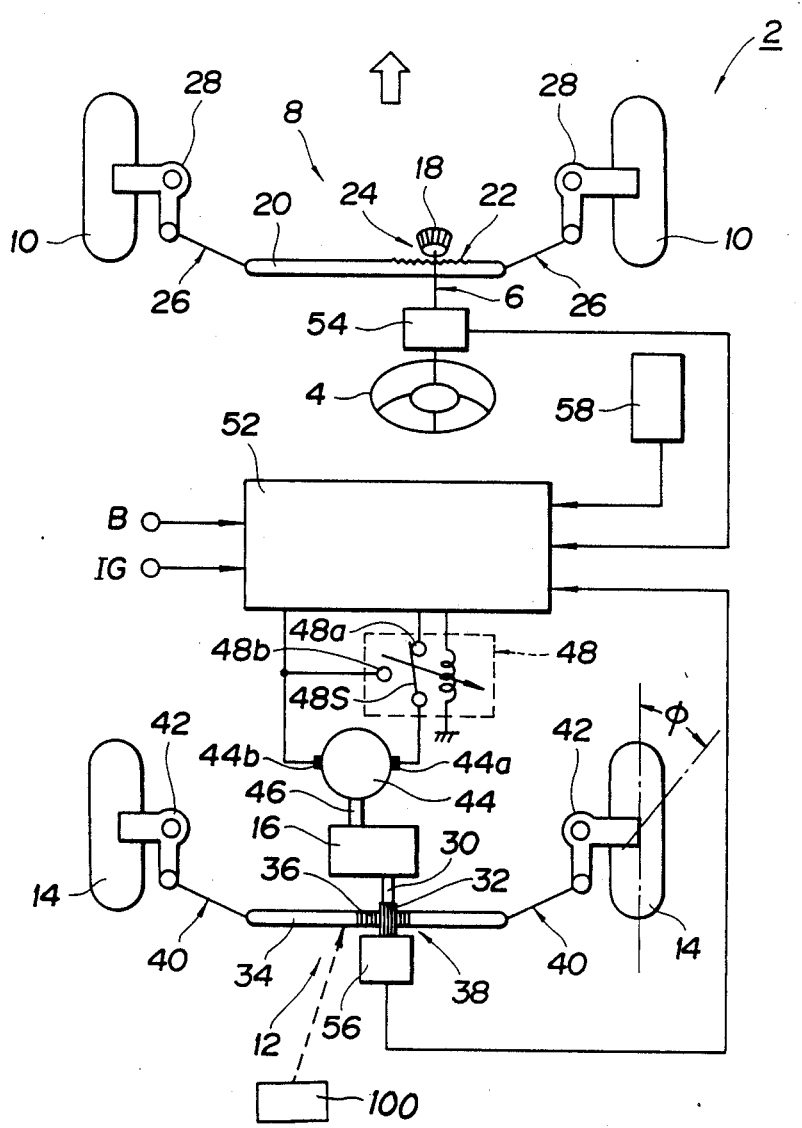
Figure 2:
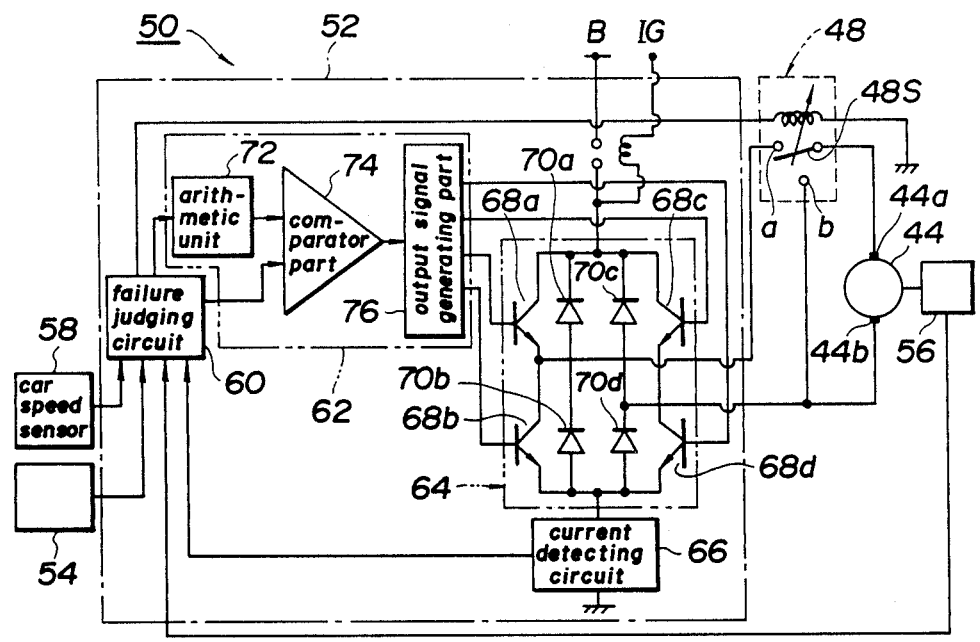

Referring now to the drawings, an embodiment of this invention is described in detail below.

In FIG. 1, 2 is a vehicle, 4 is a steering wheel, 6 is a steering shaft, 8 is main turning means which is a steering device, 10, 10 are front wheels which are main steered wheels, 12 is subsidiary turning means which is a rear wheel steering device, 14, 14 are rear wheels which are subsidiary steered wheels, and 16 is a speed reduction mechanism.

The main turning means 8 is composed of a front rack and pinion mechanism 24 comprising a front pinion 18 affixed to the end of the steering shaft 6 and a front rack 22 having a front rack bar 20 to be engaged with this front pinion 18, front tie rods 26, 26 linked to the ends of this front rack bar 20, and front knuckle arms 28, 28 linked to these front tie rods 26, 26 and also coupled with the front wheels 10, 10.

The subsidiary turning means 12 is composed of a rear rack and pinion mechanism 38 comprising a rear pinion 32 disposed on a linkage shaft 30 from the reduction mechanism 16 and a rear rack 36 disposed on a rear rack bar 34 engaged with this rear pinion 32, rear tie rods 40, 40 linked to the ends of the rear rack bar 34, and rear knuckle arms 42, 42 linked to the rear tie rods 40, 40, and also coupled with the rear wheels 14, 14. By the drive of the reduction mechanism 16, the rear pinion 32 turns through the linkage shaft 30, and by the rotation of this rear pinion 32, the rear rack bar 34 moves in the lateral direction of the vehicle 2.

The reduction mechanism 16 is coupled with a motor 44 for driving and controlling the subsidiary turning means 12 by way of transmission shaft 46. When a power source is not connected to this motor 44 and the reduction mechanism 16 is not controlled, that is, while the rear rack bar 34 is free to move in the lateral direction and the rear wheels 14, 14 are set free, the rear rack bar 34 is held in the neutral position by means of a neutral position holding mechanism 100 including a preset spring and others, and the steering angle $\phi$ of the rear wheels 14, 14 is maintained at zero.

The motor 44 is driven and controlled by a control means 52 by way of a motor short-circuit relay 48 having a moving contact 48S for connecting and disconnecting relay terminals 48 and 48b to the terminal 44a of the motor 44. The motor 44, relay 48 and control circuit 52 are part of a control system 50.

The control circuit 52 comprises a front wheel steering angle sensor 54 for detecting the steering angle of the steering shaft 6 and steering amount and steering force of the front wheels 10, 10, a rear wheel steering angle sensor 56 for detecting the steering angle of the rear wheels 14, 14 by monitoring the amount that the rotation of the motor 44 turns the rear pinion 32, a vehicle speed sensor 58 for detecting the speed of the vehicle 2, a current detecting circuit 66 which is discussed below, a battery power source B, and an ignition power source IG.

The control circuit 52 receives detection signals from the sensors 54, 56, 58 and power source detection circuit 66, and delivers a control signal for driving and controlling the motor 44 by way of the contact 48S of the motor short-circuit relay 48, and also turns off the motor short-circuit relay 48 as the trouble of the control system 50 in the event of the trouble of sensors 54, 56, 58 or when power is not supplied in spite of the drive command issued to the motor 44; in other words, it operates the contact 48S to the terminal 48b side in order to shut off the transmission of the control signal from the control circuit 52 to the motor 44 side, and short-circuits the terminals 44a, 44b of the motor 44.

More specifically, the control circuit 52 delivers power by way of the motor short-circuit relay 48 to drive the motor 44 unless a failure of the control system 50 occurs. A failure of the control system 50 occurs when: one of the sensors 54, 56 or 58 does not operate or indicates a wrong numerical value; the motor 44 is not driven despite an attempt by the control circuit 52 to drive it; or the control circuit operates erroneously. In the event of such a failure of the control system 50, the motor short-circuit relay 48 is switched as described above.

Figure 3:
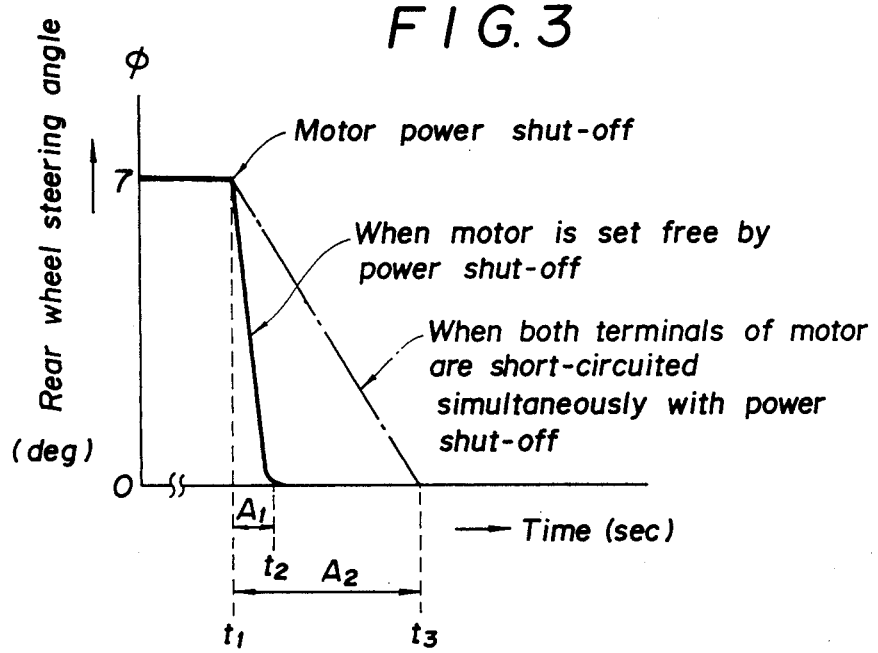

This control circuit 52 is composed as shown in FIG. 3. The control circuit 52 comprises a failure judging circuit 60, a steering angle arithmetic processing circuit 62, a motor driving circuit 64, and the current detecting circuit 66.

The failure judging circuit 60 communicates with the front wheel steering angle sensor 54, rear wheel steering angle sensor 56, vehicle speed sensor 58, and motor driving circuit 64, and is connected with the current detecting circuit 66 for detecting the load current of the motor 44, and it determines the trouble of the sensors 54, 56, 58 or the supply state of power to the motor 44, or determines whether the control system 50 is operating normally or not, according to the changes in detection signals such as the front wheel steering angle signal and front wheel steering force signal from the front wheel steering angle sensor 54, rear wheel steering angle signal from the rear wheel steering angle sensor 56, car speed signal from car speed sensor 58, and load current signal from current detecting circuit 66. The failure judging circuit 60 also switches the motor short-circuit relay 48 as described above in response to a failure of the control system 50.

The steering angle arithmetic processing circuit 62 is composed of an arithmetic unit 72 for calculating the desired steering angle of the rear wheels 14, 14 based on the detection values such as steering angle of front wheels 10, 10 stored in the memory of the failure judging circuit 60, steering force of front wheels 10, 10, and vehicle speed. A comparator part 74 for comparing the desired steering angle of the rear wheels 14, 14 calculated in the arithmetic unit 72 with the actual steering angle of the rear wheels 14, 14 stored in the memory of the failure judging circuit 60 delivers a deviation signal to an output signal generator part 76 which delivers a drive signal to the motor drive circuit 64 on the basis of the deviation signal from the comparator part 74. Thus, the drive signal depending on the car speed, front wheel steering angle, and front wheel steering force is delivered to the motor drive circuit 64. The motor drive circuit 64 is composed of first to fourth transistors 68a, 68b, 68c, 68d, and first to fourth diodes 70a, 70b, 70c, 70d which are connected as specified. In this embodiment, power from the power source B can be delivered to the motor 44 via the transistors 68a and 68d, or 68c and 68b, provided the relay 48 is configured so that its contacts 48S and 48a are connected. The control circuit 52, when abnormality of the control system 50 is judged, delivers an OFF signal to the motor short-circuit relay 48 which is conducting the motor drive circuit 64 and motor 44, which OFF signal controls the contact 48S in order to disconnect the motor 44 from the motor drive circuit 64 and short-circuit the terminals 44a, 44b of the motor 44. As a result, when the rear wheels 14, 14, no longer steered by the motor 44, are about to be returned to zero steering angle by of the neutral position holding mechanism 100 composed of a spring and others as well as external force, the motor 44 is operated like a generator, and the steering angle $\phi$ of the rear wheels 14, 14 is gradually returned to zero.

The operation of this embodiment is described below.

While the vehicle 2 is running at high speed, the control circuit 52 judges the trouble of the control system 50 or abnormality of the supply of power to the motor 44 by the changes in the state of the front wheel steering angle signal and front wheel steering force signal from the front wheel steering sensor 54, the rear wheel steering angle signal from the rear wheel steering angle sensor 56, the vehicle speed signal from vehicle speed sensor 58, and the load current signal from the current detecting circuit 66.

In the steering angle arithmetic processing circuit 62, the arithmetic unit 72 calculates a desired rear wheel steering angle on the basis of detection values of the front wheel steering angle stored in the memory of the failure judging circuit 60, and the front wheel steering force, vehicle speed, and motor load current. In consequence, the comparator part 74 compares the desired rear wheel steering angle calculated in the arithmetic unit 72 with the actual rear wheel steering angle stored in the memory of failure judging circuit 60, and delivers the deviation signal to the output signal generating part 76. This output signal generating part 76 delivers a drive signal to the motor drive circuit 64 on the basis of the deviation signal.

When the control system 50 is operating normally, the motor short-circuit relay contact 48S is connected to relay terminal 48a by a control signal from the failure judging circuit 60, and thus the power source B is connected to the motor 44 by way of the motor drive circuit 64 and the relay 48. The motor 44 operates the rear rack and pinion mechanism 38 through the transmission shaft 46, reduction gear 16, and communication shaft 30, so that the rear wheels 14, 14 are steered and controlled as desired.

On the other hand, while the vehicle 2 is running at high speed, if at least one of sensors 54, 56, 58 becomes defective, that is, if trouble should occur in the control system 50, the failure judging circuit 60 judges an abnormality and issues an OFF signal to the motor short-circuit relay 48 which connects the motor drive circuit 64 and motor 44. As a result, the contact 48S of the motor shortcircuit relay 48 is changed over to the relay terminal 48b, so that the connection of the power source B to the motor 44 is cut off and the terminals 44a, 44b of the motor 44 are short-circuited. Therefore, by the thrusting action of the neutral position holding mechanism 100 composed of external force and spring when the steering angle $\phi$ of the rear wheels 14, 14 is about to be returned to zero, the motor 44 is operated like a generator, and the steering angle $\phi$ of the rear wheels 14, 14 is gradually converged to zero. As a result, as shown in FIG. 3, in a conventional system, when the power source to the motor 44 is shut off, the steering angle $\phi$ of the rear wheels 14, 14 returns to zero in a specified time A1 (about 0.3 seconds) from time $t_1$ of interruption of power supply to the motor 44 to time $t_2$. But in the case of this invention, when the terminals 44a, 44b of the motor 44 are short-circuited when the supply of power to the motor 44 is cut off, the steering angle $\phi$ of the rear wheels 14, 14 can be returned to zero in a longer specified time A2 (about 1.3 seconds) from time $t_1$ to time $t_3$, so that the rear wheels 14, 14 are returned to the neutral position without causing sudden behavior change that the driver cannot cope with, and the vehicle 2 can be steered by two wheels only, that is, front wheels 10, 10. Thus, abnormal control of the rear wheels 14, 14 may be prevented in the event of abnormality of the control system 50 due to trouble of sensors 54, 56, 58, and it is possible to smoothly transfer to two-wheel steering, and safety is enhanced.

As is clear from the detailed description above, according to this invention, the control means is provided in order to shut off the power source to the motor and short-circuit the terminals of the motor to converge the steering angle of the subsidiary steered wheels gradually to zero in the event of abnormality of the control system. Therefore, the steering angle of the subsidiary steered wheels can be slowly converged to zero, the subsidiary steered wheels can be returned to the neutral position without causing sudden behavior changes in the vehicle, and the steering of the vehicle can be transferred to two-wheel steering, thereby preventing abnormal control of the subsidiary steered wheels due to trouble in the control system, and thus transferring smoothly from four-wheel steering to two-wheel steering to enhance safety.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A four-wheel steering device for an automobile comprising main turning means for steering main steered wheels, subsidiary turning means for steering subsidiary steered wheels, neutral position biasing means for yieldably urging the subsidiary steered wheels to a neutral position having a steering angle of zero, and a control system including a motor having terminals, first steering angle sensor means for main steered wheels for detecting a first steering angle of the main steered wheels, second steering angle sensor means for subsidiary steered wheels for detecting a second steering angle of the subsidiary steered wheels, and control means responsive to a state change of the first and second detected steering angles for judging an operating state of the control system, said control means being operable when said control system operates normally for driving and controlling the motor and thereby the subsidiary turning means so as to steer the subsidiary steered wheels depending on the steering angle of the main steered wheels, said control means being further operable when said control system operates abnormally for cutting off the power source to the motor in order to converge, by the urging of the neutral position biasing means, the steering angle of the subsidiary steered wheels gradually to zero and to also short-circuit the terminals of the motor.

2. A four-wheel steering device for an automobile as set forth in claim 1, wherein the control means comprises a failure judging circuit communicating with the first steering angle sensor means and the second steering angle sensor means, current detecting means for detecting a load current of the motor, and vehicle speed sensor means for detecting automobile speed, said current detecting means and said vehicle speed sensor means also communicating with said failure judging circuit, said failure judging circuit including a memory for storing detection values from at least one of said first and second steering angle sensor means, said vehicle speed sensor means and said current detecting means, said control means further including a steering angle arithmetic processing circuit composed of arithmetic means for calculating a desired steering angle of subsidiary steered wheels based on detection values stored in the memory of said failure judging circuit, comparator means for comparing said desired subsidiary steered wheel steering angle calculated in said arithmetic means with a subsidiary steered wheel steering angle stored in the memory of the failure judging circuit and delivering a deviation signal, and output signal means for delivering a drive signal based on the deviation signal from said comparator means, said control means further including motor drive means for receiving said drive signal from the steering angle arithmetic processing circuit and delivering a control signal, and a motor short-circuiting relay for receiving the control signal in order to drive and control the motor.

3. In a four-wheel steering device for a vehicle including main steering means for steering front vehicle wheels, subsidiary steering means for steering rear vehicle wheels through a range of steering angles relative to a neutral unsteered position, and neutral position biasing means for yieldably urging the rear wheels to the neutral unsteered position so as to have a steering angle of zero, the improvement comprising:
first means for providing a first detection signal representing the steering angle of the front vehicle wheels, and second means for providing a second detection signal representing the steering angle of the rear vehicle wheels;
a motor for driving the subsidiary means to steer the rear vehicle wheels, and third means connected to said motor and responsive to said first and second detection signals for operating said motor via terminals thereof;
fourth means for selectively disconnecting said third means from said motor; and
fifth means cooperable with said fourth means for shunting said terminals of said motor when said third means is disconnected from said motor to resist the urging of the neutral position biasing means and cause the steering angle of the rear vehicle wheels to converge gradually to zero.

* * * * *